United States Patent [19]

Weir et al.

[11] 4,157,912
[45] Jun. 12, 1979

[54] PROCESS FOR RECOVERY OF COPPER AND ZINC FROM COMPLEX SULPHIDES

[75] Inventors: Donald R. Weir, Fort Saskatchewan; Godefridus M. Swinkels; Ernest G. Parker, both of Rossland; Eva A. Vosahlo, Fort Saskatchewan; Roman M. Genik-Sas-Berezowsky, Edmonton, all of Canada

[73] Assignees: Cominco Ltd., Trail; Sherrit Gordon Mines Limited, Toronto, both of Canada

[21] Appl. No.: 933,372

[22] Filed: Aug. 14, 1978

[30] Foreign Application Priority Data

Aug. 19, 1977 [CA] Canada .................. 285127

[51] Int. Cl.² .................. C22B 15/12; C22B 19/22
[52] U.S. Cl. .................. 75/101 R; 75/115; 75/117; 75/120; 423/41; 423/48; 423/101
[58] Field of Search .......... 75/115, 117, 120, 101 R; 423/41, 48, 101

[56] References Cited

U.S. PATENT DOCUMENTS

| 3,053,651 | 9/1962 | McGauley .................. 75/101 R |
| 3,891,522 | 6/1975 | McKay et al. .................. 423/48 X |
| 3,957,602 | 5/1976 | Johnson et al. .................. 75/115 X |
| 3,964,901 | 6/1976 | Swinkels et al. .................. 75/108 |
| 4,049,770 | 9/1977 | Swinkels et al. .................. 423/41 X |
| 4,093,526 | 6/1978 | Blanco et al. .................. 75/117 X |

Primary Examiner—G. Ozaki
Attorney, Agent, or Firm—Arne I. Fors; Robert F. Delbridge

[57] ABSTRACT

A process for treating thermally activated metal sulfides containing copper, iron and zinc for separate recovery of zinc as zinc sulfide in which the metal sulfides are subjected to a two-stage countercurrent acid leach for the formation of copper sulfide containing acid leach residue and ferrous sulfate solution. The second-stage acid leach is performed in two steps; the first step is operated at a relatively high pulp density and high acid concentration for iron and zinc extraction, the resulting slurry diluted, and the second step is operated at a relatively low pulp density and low acid concentration for dissolution of precipitated ferrous sulfate and precipitation of any dissolved copper values by $H_2S$. The diluent solution for the slurry from the second-stage first step preferably is generated sulfuric acid solution from a jarosite precipitation and iron and zinc-containing solution from a subsequent activation leach. Zinc in solution from the acid leach and activation leach is precipitated as zinc sulfide in substantially pure form.

16 Claims, 1 Drawing Figure

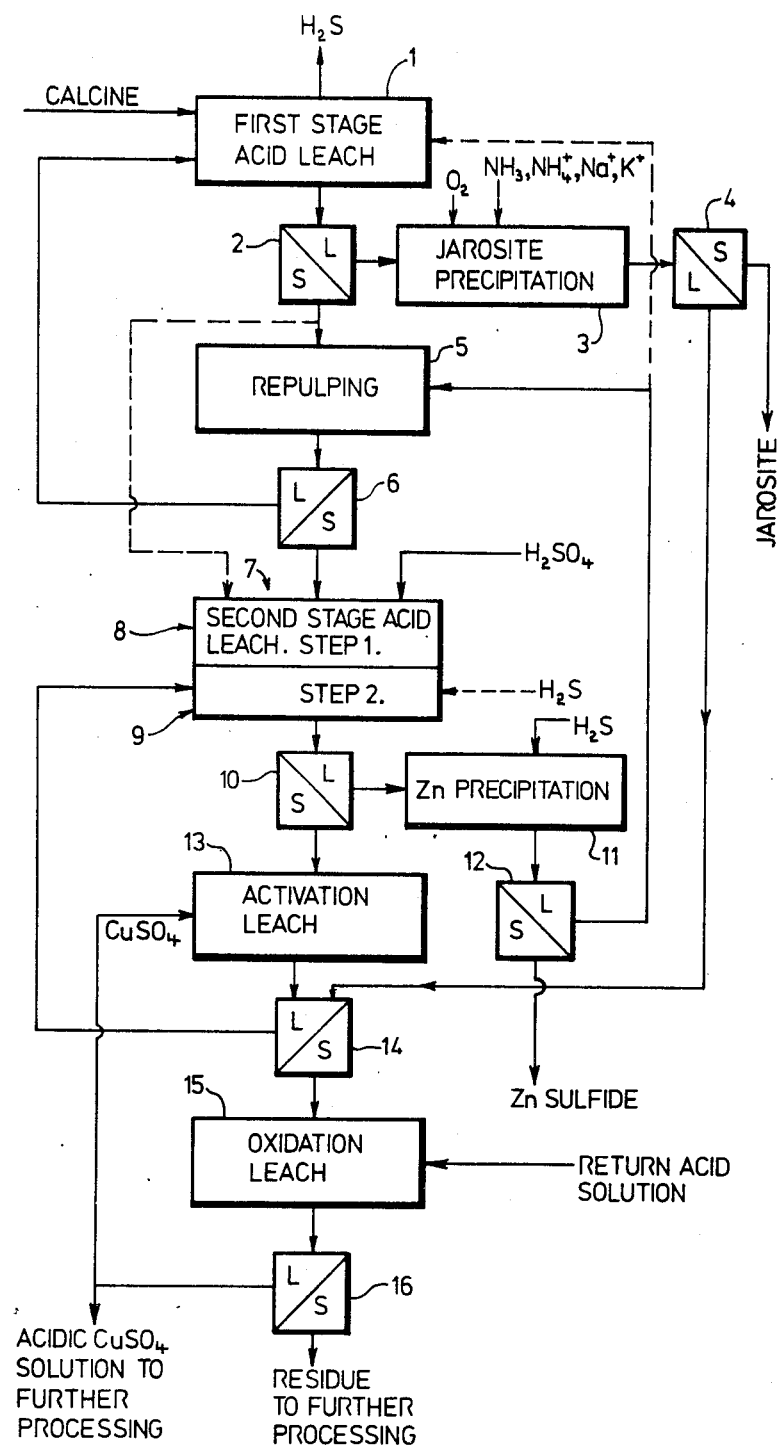

PROCESS FOR RECOVERY OF COPPER AND ZINC FROM COMPLEX SULPHIDES

This invention is directed to a hydrometallurgical process for the recovery of non-ferrous metals from iron-containing complex sulfides and, more particularly, to an improvement in a process for the recovery of copper and zinc from iron-containing copper and zinc sulfides.

Many processes have been disclosed for the extraction of ferrous and non-ferrous metals from complex iron-containing sulfides. In recent years, these processes have been developed into integrated processes using hydrometallurgical techniques alone or in combination with pyrometallurgical techniques whereby such metals as iron, copper, zinc, nickel and cobalt, as well as sulfur, are efficiently separated and recovered in elemental form or as relatively pure compounds and concentrates, while small amounts of other contained values such as molybdenum and precious metals may also be recovered as concentrates. For example, one such integrated process is disclosed in U.S. Pat. No. 3,816,105 according to which copper-iron sulfides are leached with an acidic copper sulfate solution, obtained from a subsequent process step, for the formation of simple copper sulfides and a ferrous sulfate solution; the solution is oxidized and hydrolyzed for the precipitation and removal of iron from the process; the simple copper sulfides are subjected to an oxidizing pressure leach for formation of elemental sulfur, copper sulfate solution and a residue containing precious metals, molybdenum and residual sulfides; the copper sulfate solution is purified; copper is recovered from the purified solution; and generated acid solutions are recycled within the process. Zinc which dissolves at least partly in the leach with acidic copper sulfate solution and at least partly in the oxidizing pressure leach, and other minor metals, are removed from the process in a bleed stream. Thus, this process does not provide for the separate recovery of zinc contained in the sulfides.

In U.S. Pat. No. 3,964,901 there is disclosed an integrated process for treating metal sulfides containing iron and non-ferrous metals including copper, wherein the metal sulfides are thermally activated in a heating zone and a subsequent reducing zone; activated sulfides are acid leached to form a residue and a ferrous sulfate solution; the gaeous reaction products are converted for the recovery of elemental sulfur and/or sulfuric acid, the latter, at least partly, for in-process use; iron compounds are precipitated from the ferrous sulfate solution and acid is regenerated; acid leach residue is subjected to a wet activation leach and/or an oxidizing pressure leach; elemental sulfur, copper, precious metals and residue are recovered and residual solutions are recycled in the process. In this process, solution obtained from wet activation leaching of acid leach residue with acidic copper sulfate solution is treated with $H_2S$ for the separate precipitation and recovery of zinc sulfide and cobalt and nickel sulfides.

According to the disclosure of U.S. Pat. No. 3,964,901, the calcine obtained from the thermal activation is subjected to an acid leach which is preferably carried out countercurrently in two stages. Solution from the first stage is treated for the removal of iron as jarosite and generated acid solution is used in the second stage of the acid leach. Solution from the second stage is returned to the first stage. The acid leach residue is treated, according to one embodiment, in a wet activation with acidic copper sulfate solution for replacement by copper of residual iron and any zinc, lead, nickel and cobalt values present in the solids residue with production of activated copper sulfides, lead sulfate and a solution of ferrous sulfate and sulfates of any znc, nickel and cobalt values present. After separation of the solids residue, the solution is treated with $H_2S$ for the precipitation of zinc sulfide alone or combined with nickel and cobalt sulfides. Precipitated sulfides are recovered and residual solution is returned to the acid leach.

In U.S. Pat. No. 4,049,770, which resulted from a divisional application of U.S. Pat. No. 3,964,901, there is disclosed a process for recovery of zinc values contained in thermally activated, iron-containing copper and zinc sulfides. This process is similar to the process described above with reference to the disclosure of U.S. Pat. No. 3,964,901.

The processes disclosed in U.S. Pat. Nos. 3,964,901 and 4,049,770 have several shortcomings. To maximize iron extraction in the acid leach, it is necessary to perform the acid leach in two stages wherein high concentrations of acid are required in the second stage. This high acid concentration results in the dissolution of appreciable amounts of zinc in the second stage and, because the solution from the second stage is returned to the first stage of the acid leach, the solubilized zinc is precipitated on the calcine fed to the leach as the acid content is depleted and $H_2S$ is generated by the leaching of iron sulfides. This result is highly undesirable for two major reasons: a portion of the precipitated zinc is releached in the high-acid second stage which increases the overall concentration of zinc circulating and, secondly, zinc precipitated onto calcine decreases the amount of iron that is extracted in the acid leach by as much as 15%.

We have now found that these disadvantages can be overcome by modifying the acid leach-wet activation leach-$H_2S$ precipitation circuit by performing the second-stage acid leach in two steps, operating the first step at a relatively high pulp density, diluting the slurry in the second step with solution from the wet activation leach, treating solution from the second step with $H_2S$, and removing and recovering zinc.

Accordingly, there is provided a process for treating thermally activated metal sulfides containing iron and non-ferrous metals including copper and zinc by countercurrently acid leaching activated sulfides in two stages, removing iron in an iron removal as jarosite with formation of sulfuric acid, treating acid leach residue with acidic copper sulfate solution to form activated simple copper sulfides in an activation leach, precipitating zinc as zinc sulfide, subjecting activated simple copper sulfides to an oxidation pressure leach and subjecting purified resulting copper sulfate solution to treatment for recovery of copper which comprises the steps of subjecting thermally activated metal sulfides to a first-stage acid leach in acid solution containing sulfuric acid in a concentration in the range of 60 to 130 g/l and not more than 5 g/l zinc, subjecting solids obtained from said first-stage acid leach to a second-stage acid leach in a first step and a second step, said first step consisting of leaching said solids in a slurry with sulfuric acid added in an amount sufficient to give an acid concentration in the range of 200 to 300 g/l $H_2SO_4$, diluting said slurry in said second step by mixing said slurry with generated sulfuric acid solution formed in said iron removal and iron and zinc-containing solution obtained from said activation leach, precipitating any copper present in solution in said second step of said second-stage acid leach, separating essentially copper-free solution from the diluted slurry, precipitating substantially pure zinc sulfide from said copper-free solution with $H_2S$ at a partial pressure of $H_2S$ of at least 500 kPa and at a temperature of at least 80° C., separating zinc sulfide from acid solution, and returning said acid solution to the first-stage acid leach.

The process of the invention will now be described in detail with reference to the FIGURE which schematically illustrates the flowsheet of the process.

Thermally activated sulfides are fed to the first-stage acid leach 1 wherein the sulfides are mixed with an acid solution for the dissolution of iron as ferrous sulfate with evolution of $H_2S$. Thermally activated sulfides (calcine) are obtained from concentrates of complex metal sulfides containing iron, copper, sulfur, zinc, other ferrous and non-ferrous metals and precious metals, by treating concentrates according to such methods, for example, as disclosed in U.S. Pat. Nos. 3,053,651 and 3,964,901, whereby the iron in the concentrates is converted into an acid soluble form. Usually, 60 to 80% of the iron in such activated sulfides is leachable under the conditions of the acid leach. At least a portion of the acid solution may be obtained either from liquid-solids (L/S) separation 6, to be described, or from liquid-solids separation 12 (as indicated by the broken line in the FIGURE) as will be described herein below. The acid solution, which contains sulfuric acid in a concentration in the range of 60 to 130 g/l, 15 to 40 g/l iron as ferrous sulfate and is essentially free of copper, should have as low a zinc content as possible, as under the conditions of the first-stage acid leach 1 zinc contained in the acid solution and zinc dissolved from activated sulfides in acid leach 1 precipitate on calcine particles. The precipitated zinc sulfide impairs the leachability of iron from the calcine and thus reduces the iron extraction. The zinc content of the solution fed to the first-stage acid leach from either separation 6 or separation 12 can be controlled at less than 5 g/l.

The first-stage acid leach 1 is carried out in one or more closed, agitated vessels. Froth breakers and foam baffles may be employed to control foaming and to stop short circuiting of material due to flotation.

Leach 1 is carried out at temperatures in the range of 60° to 100° C., but in order to obtain good iron extraction the temperature should preferably be at least 75° C. The leach is preferably carried out at temperatures in the range of 95° to 100° C. The pressure of the leach is essentially atmospheric pressure, but a slightly sub-atmospheric pressure is preferred to maintain a hygienic operation. Retention times in the range of 30 to 120 minutes are adequate to obtain the required degree of extraction. After completion of the first stage acid leach, the leach slurry, which may contain from 10 to 30 g/l sulfuric acid and from 20 to 120 g/l iron as ferrous sulfate, is subjected to liquid-solids separation 2. All liquid-solids separations in the process of the invention are carried out by using conventional methods, such as thickening, filtration or centrifuging, and conventional equipment. The liquid fraction from separation 2 is passed to jarosite precipitation 3.

In jarosite precipitation 3, the ferrous sulfate-containing solution in the liquid fraction from separation 2 is oxidized and hydrolyzed in the presence of ammonia, or a suitable ammonium, or alkali-metal compound in an amount in the range of 50 to 200% of the stoichiometric amount required to form jarosite under elevated temperature and pressure to precipitate substantially all iron in the solution as jarosite with simultaneous generation of sulfuric acid solution. The precipitation of jarosite is carried out in an agitated pressure vessel at temperatures in the range of 100° to 230° C. and at an oxygen partial pressure in the range of 50 to 1400 kPa. In a preferred embodiment, the precipitation is carried out in a compartmented autoclave having 3 or 4 compartments each having an agitator disposed therein. An oxygen-bearing gas, such as oxygen, air, or oxygen enriched air, ferrous sulfate solution and a jarosite-forming compound are fed into the first compartment of the autoclave. The jarosite-forming compound may, for example, be ammonia, which is injected into the solution entering the autoclave, or which is sparged into the solution in the first compartment in an amount in the range of 50 to 200, preferably 70 to 100%, of the stoichiometric amount required to form ammonium jarosite. The solution fed to the autoclave should preferably contain from 20 to 100 g/l iron, preferably 50 to 80 g/l, up to 50 g/l acid, preferably 1 to 30 g/l acid and a small amount of copper such as from 0.1 to 3 g/l, the latter to reduce corrosion. In order to attain low iron levels in the final solution, the acid content of the feed solution should be as low as possible. The oxygen partial pressure is preferably maintained in the range of 50 to 1400 kPa, preferably 350 to 700 kPa. The solution may be preheated to a temperature below the temperature at which ferrous sulfate will precipitate, such as to temperatures in the range of 70° to 130° C., preferably about 110° C. The temperatures in the autoclave compartments are established in such a way that a reverse temperature gradient is maintained through the autoclave in order to prevent precipitation of ferrous sulfate and to obtain maximum iron removal from the solution as jarosite. A reverse temperature gradient, whereby each compartment is at a temperature lower than that of its subsequent compartment, is established by injecting steam in the vapor phase of the last compartment of the autoclave. The amount of steam injected should be sufficient to raise the temperature of the reaction mixture in the last compartment to a temperature in the range of 170° to 230° C., preferably 175° to 200° C., which results in a temperature in the first compartment of at least 100° C., preferably in the range of 100° to 160° C. A retention time of the solution in the autoclave in the range of 20 to 90 minutes, preferably 30 to 60 minutes, is sufficient to ensure a residual iron content in the final solution of from 2 to 15 g/l, usually from 2 to 7 g/l.

The jarosite precipitation may be illustrated by the following example, wherein ammonium jarosite was precipitated from solution from the first-stage acid leach. 21.6 l/min. of a solution containing 48.9 g/l Fe, 23.0 g/l $H_2SO_4$ was continuously fed to the first compartment of a four-compartment autoclave for a period of 22.3 hours. Ammonia was fed into the solution in the first compartment at a rate of 0.158 kg/min. Oxygen was fed into the first compartment of the autoclave. Steam was injected into the gas phase in the fourth compartment of the autoclave in an amount sufficient to establish and maintain a temperature in the fourth compartment of 188° C. The temperature in the first compartment was 115° C., in the second compartment 149° C. and in the third compartment 171° C. The total pressure in the autoclave was 2150 kPa. The nominal retention time was 37 minutes. The reaction mixture was discharged from the autoclave and separated into solids and solution. The solution contained 3.3 g/l Fe, 40 g/l free acid, 3.18 g/l NH$_3$, 1.51 g/l Cu and 0.12 g/l Zn, while the solids analyzed 32.8% Fe, 13.2% total S and 2.94% NH$_3$. The composition of the final solids approximately corresponded to that of ammonium jarosite.

The reaction slurry is discharged from the pressure vessel and subjected to liquid-solids separation 4, wherein the jarosite is separated for subsequent impoundment. The generated sulfuric acid-containing solution from separation 4, which contains an amount of sulfuric acid in the range of 40 to 60 g/l and not more than 15 g/l iron, usually from 2 to 7 g/l iron, is mixed with the reaction slurry obtained from activation leach 13, as will be described hereinafter.

The solids fraction from liquid-solids separation 2 may be fed either directly to the second-stage acid leach 7, to be described, as indicated by the broken line in the FIGURE, or to repulping 5. In repulping 5, the solids fraction from separation 2 is repulped with at least a portion of the acid solution obtained from liquid-solids separation 12 following zinc precipitation 11, to be described, to wash as much entrained dissolved iron from the solids as possible. The acid solution from separation 12 is essentially free of copper, contains not more than 5 g/l zinc, usually from 1 to 3 g/l zinc, from 15 to 40 g/l iron as ferrous sulfate and from 90 to 130 g/l sulfuric acid. The repulping is carried out in a suitable, agitated vessel at ambient conditions. The repulped mixture is then subjected to liquid-solids separation 6. The liquid fraction is fed as the acid solution to the first-stage acid leach 1 and the solids fraction is fed to the first-step 8 of the second-stage acid leach 7.

Second-stage acid leach 7 is carried out in a first step 8 and a second step 9. In first step 8, the solids fraction from separation 2 or from separation 6 is mixed in one or more suitable, agitated vessels with sulfuric acid in an amount sufficient to form a slurry. High acid concentrations are required in step 8 to maximize the extraction of iron. Concentrated sulfuric acid, for example, of 93% strength, is mixed with the solids fraction in an amount sufficient to give an acid concentration in the range of 200 to 300 g/l H$_2$SO$_4$, preferably 200 to 250 g/l. The upper limit of the sulfuric acid concentration is governed primarily by pulp density and by the reaction of sulfuric acid and H$_2$S whereby elemental S or SO$_2$ are formed. The pulp density of the slurry is usually in the range of 40 to 50%. Because of the high acid concentrations, appreciable amounts of zinc are also solubilized. The extraction of zinc in the second-stage leach increases with temperature and acid content of the reaction mixture. The temperature of the reaction slurry in step 8 is maintained in the range of 60° to 100° C. and preferably in the range of 80° to 95° C. The slurry is passed from step 8 to second step 9, wherein the slurry is diluted with iron and zinc-containing solution from liquid-solids separation 14, to be described. The iron and zinc-containing solution may contain 5 to 20 g/l Fe, 5 to 20 g/l zinc, 30 to 70 g/l acid and less than 5 g/l Cu. In a preferred embodiment this solution may comprise generated sulfuric acid solution from liquid-solids separation 4 and iron and zinc-containing solution from activation leach 13, to be described. The dilution in step 9 is accomplished in a suitable, agitated vessel at atmospheric pressure and at the prevailing temperature of the slurry of step 8. The dilution also serves to dissolve any ferrous sulfate that might have precipitated. Any copper that is present in the liquid from liquid-solids separation 14 is precipitated in step 9 by H$_2$S which is present in the slurry from step 8. If necessary, additional H$_2$S may be sparged into the slurry to ensure that all copper is precipitated so that the solution treated for the recovery of zinc is essentially free of copper. liquid-solids separation 10; the liquid fraction is fed to zinc precipitation 11 and the solids fraction, which is the acid leach residue, is subjected to activation leach 13, to be described.

The two-stage countercurrent acid leach may be exemplified as follows. Thermally activated metal sulfides discharged from a roaster were quenched in water and the aqueous calcine slurry fed to the first-stage acid leach. The calcine analyzed 27% Cu, 31% Fe, 3.2% Zn and 27.5% S$_T$(total sulfur). The slurry feed rate was 216 l/hr for a calcine feed rate of 173 kg/hr. The slurry was leached in two agitated vessels in series, equipped with foam baffles, with solution obtained from the subsequent repulping step containing 89.3 g/l acid, 33.8 g/l Fe and 3.4 g/l Zn. The temperature in the first stage was maintained at 84° C. and the retention time of the reaction mixture was 123 minutes. The acid leached slurry from the first stage was thickened and the thickener overflow which contained 51.7 g/l Fe, 29.8 g/l acid and 0.114 g/l Zn was fed to the subsequent jarosite precipitation. The thickener underflow which contained 32.2% Cu, 15.4% Fe, 7.5% Zn and 23.5% S$_T$ was repulped with essentially copper-free solution obtained from a subsequent zinc precipitation step and containing 0.01 g/l Cu, 30.4 g/l Fe, 3.0 g/l Zn and 109.0 g/l acid. The repulped material was subjected to liquid-solids separation in a thickener from which the overflow was recycled to the first-stage acid leach and the underflow, which contained 36.2% Cu, 14.3% Fe, 8.5% Zn and 23.6% S$_T$, was fed to the first of two agitated vessels of the first step of the second-stage acid leach. In the first vessel of the first step, 93% sulfuric acid was added to give a free acid concentration of 250 g/l in the second vessel. The temperature in the first step of the second-stage acid leach was maintained at 87° C. and the retention time was 247 minutes. The reaction mixture from the first step was mixed in the second step of the second-stage acid leach in an agitated vessel with solution which was recycled from a subsequent activation leach and which analyzed 1.5 g/l Cu, 22.1 g/l Fe, 11.7 g/l Zn and 57.7 g/l acid. The resulting slurry discharging from the second-step vessel was subjected to liquid-solids separation by thickening. The thickener overflow was filtered and the filtered solution, which contained 30.9 g/l Fe, 99.4 g/l acid and 12.1 g/l Zn, was passed to the subsequent step for zinc removal. The thickener underflow, which contained the final acid leach residue containing 42.0% Cu, 10.5% Fe, 6.0% Zn and 21.8% S$_T$, was fed to the subsequent activation leach.

In zinc precipitation 11, the essentially copper-free solution from separation 10 is treated in a well-agitated reaction vessel with H$_2$S for the precipitation of zinc as zinc sulfide at a temperature in the range of from ambient temperature to 130° C., and at a partial pressure of H$_2$S in the range of 200 to 700 kPa. The essentially copper-free solution fed to precipitation 11 may comprise from 5 to 20 g/l Zn, from 70 to 120 g/l free acid and from 15 to 40 g/l Fe. In order to obtain the desired degree of precipitation of zinc from strong acid solutions, a partial pressure of H$_2$S of at least 500 kPa, preferably 500 to 700 kPa, a temperature of at least 80° C., preferably 80° to 120° C., are required, while retention times in the range of 10 to 40 minutes are satisfactory.

We have found that the precipitation of zinc sulfide proceeds readily under the above recited conditions in spite of the high free acid concentrations. High acid concentrations appear to be beneficial in the avoiding of co-precipitation of sulfides of elements other than zinc. The precipitated zinc sulfide is recovered in substantially pure form from the subsequent liquid-solids separation 12. The solution obtained from separation 12, which is essentially free of copper, contains not more than 5 g/l zinc, usually from 1 to 3 g/l, from 15 to 40 g/l iron as ferrous sulfate, and from 80 to 130 g/l free acid. The solution is recycled to repulping 5, or, alternatively, at least a portion is recycled to first-stage acid leach 1.

The precipitation of zinc from essentially copper-free solution obtained from the second step of the second-stage acid leach may be illustrated by the following example. Solution containing less than 0.01 g/l Cu, 17.9 g/l ferrous iron, 6.33 g/l Zn and 69.6 g/l sulfuric acid was fed to an agitated autoclave at a rate of 16.2 l/min over a period of 17.4 hours. Hydrogen sulfide was added to the autoclave at a rate sufficient to maintain a hydrogen sulfide partial pressure of 593 kPa. The autoclave contents were heated to a temperature of 82° C. for the duration of the test. The nominal retention time was 39 min. Reaction slurry was continuously discharged from the autoclave and the slurry was filtered. The resulting solution contained less than 0.01 g/l Cu, 1.17 g/l Zn and 88.3 g/l acid, while the resulting solids analyzed 53.4% Zn, 31.6% S, 0.54% Cu and 1.02% Fe.

In the activation leach 13, the acid leach residue obtained from the second-stage acid leach 7 in liquid-solids separation 10 is reacted with an acidic copper sulfate solution for replacement by copper of iron, as well as of zinc and any nickel and cobalt values present in the solids residue with production of activated simple copper sulfides and a solution of ferrous sulfate, zinc sulfate and sulfates of any of said nickel and cobalt values present.

The activation leach is conducted in a suitable reaction vessel, such as a multi-compartment agitated autoclave, at a temperature in the range of 140° to 200° C., preferably 150° to 165° C. and under autogenous pressure. The acidic copper sulfate solution is obtained from liquid-solids separation 16 following oxidation leach 15, both to be described; this solution contains usually from 20 to 100 g/l Cu, from 3 to 15 g/l Fe, from 5 to 35 g/l $H_2SO_4$ and from 5 to 20 g/l Zn. Retention times of 1 to 4 hours are sufficient to obtain the desired degree of iron extraction. A retention time of 2 hours is preferred as longer retention times only marginally improve the iron extraction and increase the consumption of copper sulfate. The amount of acidic copper sulfate solution added to the activation leach should contain sufficient copper to obtain the desired extraction of iron, to react with other soluble sulfides to form sulfates, and to leave 0.1 to 3 g/l copper in the final solution for inhibition of corrosion. The amount of copper in the acidic copper sulfate solution is determined by the molar ratio of cupric ions and extractable iron and zinc in the solids of the feed to the activation leach. This ratio should be in the range of 0.65:1 to 2.1:1, preferably 0.8:1 to 1.2:1.

The activation leach of a solids fraction obtained from the liquid-solids separation following step 2 of the second stage acid leach may be illustrated as follows. A slurry containing 34% solids by weight was continuously fed to an agitated autoclave at a rate of 4.5 l/min and at a solids feed rate of 158 kg/hr for a total period of 23.8 hours and a nominal retention time of 4 hours. The solids in the slurry contained 38.9% Cu, 11.3% Fe, 6.8% Zn and 22.4% total S. Acidic copper sulfate solution from a subsequent oxidation leach containing 93.4 g/l Cu, 10.9 g/l $Fe_T$, 5.2 g/l Zn and 28.4 g/l free acid, was fed to the autoclave at a rate sufficient to establish a molar ratio between cupric ion in the solution and extractable iron and zinc in the solids of 1.23:1. The autoclave contents were maintained at a temperature of 142° C. and at autogenous pressure. The discharged autoclave contents were separated in an activation leach residue and a solution. The residue analyzed 54.3% Cu, 4.23% Fe, 3.01% Zn and 20.0% $S_T$, and the solution contained 1.45 g/l Cu, 22.1 g/l Fe, 11.7 g/l Zn and 57.7 g/l acid. In this activation leach 60.7% of the Fe and 53.5% of the Zn contained in the solids feed to this leach were dissolved.

After completion of the activation leach, the reaction mixture is discharged from the reaction vessel and subjected to liquid-solids separation 14, whereby activation leach residue and iron and zinc-containing solution are obtained. The activation leach residue is passed to oxidation leach 15 and iron and zinc-containing solution is recycled to second step 9 of second-stage acid leach 7. In a preferred embodiment of separation 14, the reaction mixture from activation leach 13 is mixed during the liquid-solids separation 14 with generated sulfuric acid solution obtained from separation 4. The usually low iron-containing solution from separation 4 accumulates additional iron which is entrained as dissolved iron in liquid accompanying the solids fraction in separation 14, whereby less iron is passed to the following oxidation leach. Separation 14 is preferably carried out in two-stage counter-current fashion (not shown) in thickeners or settling tanks. Reaction mixture discharged from the reaction vessel of activation leach 13 is fed to a first-stage thickener together with the overflow from the second-stage thickener. The underflow from the first-stage thickener is fed to the second-stage thickener together with solution from separation 4. The underflow from the second-stage thickener, i.e. the solids fraction from separation 14 which contains the activation leach residue comprising activated simple copper sulfides, is passed on to oxidation leach 15. The overflow from the first-stage thickener, i.e. the liquid fraction from liquid-solids separation 14, is fed as iron and zinc-containing solution to the second step 9 of the second-stage acid leach 7.

The iron and zinc-containing solution from separation 14 contains the iron dissolved in the activation leach, any copper not precipitated in the activation leach, zinc dissolved in the activation leach and any zinc and iron contained in the acidic copper sulfate solution fed to the activation leach and, in the preferred embodiment, iron contained in solution from separation 4. The solution may contain from 15 to 55 g/l Fe, less than 5 g/l Cu, from 5 to 20 g/l Zn and from 30 to 70 g/l sulfuric acid, as well as small amounts of other values.

In oxidation leach 15, the solids fraction from separation 14 containing the activation leach residue is treated in one or more stages with a return acid solution and an oxygen-bearing gas for oxidation of sulfide sulfur to elemental sulfur and for dissolving copper from the activated simple copper sulfides as cupric ion to form a copper sulfate solution. The reaction mixture from oxidation leach 15 is subjected to liquid-solids separation 16 whereby an acidic copper sulfate solution and an oxidation leach residue are obtained.

The oxidation leach is carried out in one or more stages at temperatures in the range of 70° to 110° C. and at oxygen partial pressures of up to 1500 kPa. The leach is preferably conducted in a two-stage countercurrent fashion (not shown). The solids fraction from separation 14 is slurried with liquid fraction from the second stage and the slurry is subjected to first-stage oxidation at a temperature in the range of 80° to 100° C. under essentially atmospheric pressure or an overpressure of oxygen of up to 350 kPa for a period of up to 3 hours. The reaction slurry is subjected to the first-stage liquid-solids separation. The solids fraction is subjected to second-stage oxidation together with a return acid solution obtained, for example, from further processing of copper sulfate solution such as electrowinning and which may contain 100 to 140 g/l acid, 10 to 25 g/l Cu, 5 to 10 g/l Zn and 1 to 10 g/l Fe. The second-stage oxidation is carried out at a temperature in the range of 100° to 110° C. at an oxygen partial pressure in the range of 700 to 1500 kPa for a period in the range of 3 to 4 hours. The reaction slurry is subjected to the second-stage liquid-solids separation; the liquid fraction is returned to the first stage and the solids fraction, which is indicated as the solids fraction from separation 16 in the FIGURE, is removed as oxidation leach residue. The residue may be subjected to further processing for the separate recovery of elemental sulfur, precious metals, molybdenum and residual sulfides, the latter which may be recycled. The liquid fraction from the first-stage liquid-solids separation, which is indicated as the liquid fraction from separation 16 in the FIGURE, is acidic copper sulfate solution.

The oxidation leach may be exemplified as follows. The leach was carried out continuously in two-stage countercurrent fashion, as described above, for 24 hours. 180 kg/hr of activation leach residue containing 50.2% Cu, 3.1% Fe, 1.9% Zn and 20.7% $S_T$ was fed to the first-stage oxidation autoclave together with acid solution obtained from the second-stage liquid-solids separation, which contained 91.6 g/l Cu, 10.6 g/l Fe and 33.7 g/l acid. A temperature in the first-stage autoclave of 97° C. and an oxygen partial pressure of 60 kPa were maintained. The retention time in the autoclave was 81 minutes. The reaction mixture discharged from the first-stage autoclave was separated in a liquid and a solids fraction. The liquid fraction is acidic copper sulfate solution, which contained 96.7 g/l Cu, 10.4 g/l Fe, 5.8 g/l Zn and 14.9 g/l acid, and which is removed for further processing, or of which a portion is fed to the activation leach. The solids fraction which analyzed 48.0% Cu, 3.9% Fe, 2.5% Zn and 26.3% $S_T$ was fed to the second-stage autoclave with return acid solution obtained from subsequent electrolysis of copper sulfate solution to which 93% sulfuric acid was added and which contained 30.0 g/l Cu, 4.8 g/l Fe, 5.6 g/l Zn and 117 g/l acid. A temperature in the second-stage autoclave of 104° C. and an oxygen partial pressure of 1030 kPa were maintained. The retention time in the autoclave was 175 minutes. The reaction mixture was discharged from the second-stage oxidation autoclave and separated in solution, which was returned to the first-stage autoclave, and an oxidation leach residue which analyzed 7.7% Cu, 10.0% Fe, 2.4% Zn and 64.1% $S_T$. In this oxidation leach 95% of the Cu and 59% of the Zn contained in the activation leach residue were dissolved.

The acidic copper sulfate solution contains usually from 20 to 100 g/l Cu, from 3 to 5 g/l iron, from 15 to 35 g/l $H_2SO_4$ and from 5 to 20 g/l Zn. A portion of the solution is fed to the activation leach 13, while the remaining portion is subjected to further processing to recover copper. Such further processing may include purification of the copper sulfate solution, recovering metallic copper from the purified solution by electrowinning or hydrogen reduction and recycling return acid solution to the oxidation leach.

Carrying out the process of the invention in a continuous fashion according to the preferred embodiments of the various steps of the process, the following extractions of copper iron and zinc from calcine were obtained. The extractions are expressed as cumulative extractions from concentration in %.

|  | Cu | Fe | Zn* |
| --- | --- | --- | --- |
| First-Stage Acid Leach | — | 59.1 | −63.0 |
| Second-Stage Acid Leach | — | 78.6 | 1.0 |
| Activation Leach | — | 89.8 | 36.6 |
| Multi-Stage Oxidation Leach | 98.3 | 98.6 | 97.6 |

*The negative extraction of zinc in the first-stage acid leach is a result of precipitation of zinc which is recycled to the acid leach, and the low cumulative extraction in the second-stage acid leach indicates that precipitated zinc is only partly dissolved while a certain amount of zinc is leached from the calcine.

The process of the present invention has a number of important advantages. The zinc which is dissolved in the various steps of the process, i.e. the acid leach, the activation leach and the oxidation leach, is concentrated in one solution, with the result that the concentration of zinc is increased which is more attractive for its removal. The high final acidity, required in the second stage of the acid leach for effective iron extraction, is subsequently lowered considerably by dilution to facilitate a more complete removal of the zinc from solution. Any copper present in the combined solution for zinc removal is removed prior to the precipitation of zinc, resulting in the formation of a substantially pure zinc sulfide precipitate. The solution fed to the first stage of the acid leach has a sufficiently low zinc content so that zinc does not interfere with the extraction of iron. The iron extraction is improved and the feed to the activation leach is reduced in sulfuric acid content.

It will be understood of course that modifications can be made in the embodiment of the invention illustrated and described herein without departing from the scope and purview of the invention as defined by the appended claims.

What we claim as new and desire to protect by Letters Patent of the United States is:

1. A process for treating thermally activated metal sulfides containing iron and non-ferrous metals including copper and zinc by countercurrently acid leaching activated sulfides in two stages, removing iron in an iron removal as jarosite with formation of sulfuric acid, treating acid leach residue with acidic copper sulfate solution to form activated simple copper sulfides in an activation leach, precipitating zinc as zinc sulfide, subjecting activated simple copper sulfides to an oxidation pressure leach and subjecting purified resulting copper sulfate solution to treatment for recovery of copper, which process comprises the steps of:
   (a) subjecting thermally activated metal sulfides to a first-stage acid leach in acid solution containing sulfuric acid in a concentration in the range of 60 to 130 g/l and not more than 5 g/l zinc to form ferrous sulfate solution and solids, (b) subjecting solids obtained from said first-stage acid leach to a second-stage acid leach in a first step and a second step, said first step consisting of leaching said solids in a slurry with sulfuric acid added in an amount sufficient to give an acid concentration in the range of 200 to 300 g/l $H_2SO_4$, diluting said slurry in said second step by mixing said slurry with generated sulfuric acid solution formed in said iron removal and iron and zinc-containing solution obtained from said activation leach, (c) precipitating any copper present in solution in said second step of said second-stage acid leach, (d) separating essentially copper-free solution from the diluted slurry, (e) precipitating substantially pure zinc sulfide from said copper-free solution with $H_2S$ at a partial pressure of $H_2S$ of at least 500 kPa and at a temperature of at least 80° C., (f) separating zinc sulfide from acid solution, and (g) returning said acid solution to the first-stage acid leach.

2. A process as claimed in claim 1, wherein solids obtained from said first-stage acid leach are repulped with at least a portion of said acid solution separated from said zinc sulfide, repulped solids are separated from acid solution, separated repulped solids are fed to the first step of said second-stage acid leach and separated acid solution is recycled to the first-stage acid leach.

3. A process as claimed in claim 1 or 2, wherein thermally activated metal sulfides are leached in the first-stage acid leach at a temperature of at least 75° C. and essentially atmospheric pressure with at least a portion of an acid solution essentially free of copper and containing 60 to 130 g/l sulfuric acid, 15 to 40 g/l iron as ferrous sulfate and less than 5 g/l zinc, the leached solids are separated from solution, and the separated solids are subjected to the first step of the second-stage acid leach at a temperature in the range of 60° to 100° C. wherein said solids are mixed with 93% sulfuric acid in an amount sufficient to give an acid concentration in the range of 200 to 250 g/l and a density of said solids in the mixture in the range of 40 to 50%.

4. A process as claimed in claim 1, 2 or 3, wherein the first-stage acid leach is carried out at a temperature in the range of 95° to 100° C. and the second-stage acid leach is carried out at a temperature in the range of 80° to 95° C.

5. A process as claimed in claim 1, 2 or 3, wherein $H_2S$ is added to the second step of the second-stage acid leach.

6. A process as claimed in claim 1, 2 or 3, wherein essentially copper-free solution containing 5 to 20 g/l Zn, 70 to 120 g/l free acid and 15 to 40 g/l Fe is treated with $H_2S$ at a temperature in the range of 80° to 120° C. and a partial pressure of $H_2S$ in the range of 500 to 700 kPa for the precipitation of zinc sulfide.

7. A process as claimed in claim 1, 2 or 3, wherein ferrous sulfate-containing solution obtained from the first-stage acid leach is treated for the removal of iron as ammonium jarosite and formation of generated sulfuric acid-containing solution and separating said generated sulfuric acid-containing solution containing 40 to 60 g/l sulfuric acid and not more than 15 g/l iron from said jarosite.

8. A process as claimed in claim 1, 2 or 3, wherein solids contained in the diluted slurry after separation of essentially copper-free solution are subjected to an activation leach with acidic copper sulfate solution containing from 20 to 100 g/l Cu, from 3 to 15 g/l Fe, from 5 to 35 g/l $H_2SO_4$ and from 5 to 20 g/l Zn at a temperature in the range of 140° to 200° C. under autogenous pressure for a period in the range of 1 to 4 hours at a molar ratio between cupric ions in said acidic copper sulfate solution and extractable iron and zinc in said solids in the range of 0.65:1 to 2.1:1, whereby activated simple copper sulfides and an iron and zinc-containing solution are formed.

9. A process as claimed in claim 1, 2 or 3, wherein reaction mixture from said activation leach containing activated simple copper sulfides and iron and zinc-containing solution is treated in a two-stage countercurrent separation with generated sulfuric acid solution from said iron removal as jarosite to form a solids fraction with reduced iron content and a liquid fraction consisting of iron and zinc-containing solution, and separated iron and zinc-containing solution is recycled to the second step of the second-stage acid leach.

10. A process as claimed in claim 1 or 2, wherein activated simple copper sulfides from said activation leach are subjected to a two-stage countercurrent oxidation leach at temperatures in the range of 70° to 110° C. and an oxygen partial pressure of up to 1500 kPa for oxidation of sulfide sulfur to elemental sulfur and for dissolving copper sulfides as cupric ion to form an acidic copper sulfate solution, a portion of said acidic copper sulfate solution is returned to said activation leach, the remaining portion of said acidic copper sulfate solution is purified, the purified solution is treated for the recovery of copper and return acid solution is recycled to the oxidation leach.

11. A process for treating thermally activated metal sulfides containing iron and non-ferrous metals including copper and zinc which comprises the steps of:

(a) subjecting said thermally activated metal sulfides to a first-stage acid leach in acid solution containing sulfuric acid in a concentration in the range of 60 to 130 g/l and not more than 5 g/l zinc to form a ferrous sulfate-containing solution and a solids residue, (b) treating said ferrous sulfate-containing solution for removal of iron as jarosite and formation of generated sulfuric acid-containing solution, (c) subjecting said solids residue to a second-stage acid leach in a first step and a second step, said first step consisting of leaching said solids residue in a slurry with sulfuric acid added in an amount sufficient to give an acid concentration in the range of 200 to 300 g/l $H_2SO_4$, diluting said slurry in said second step by mixing said slurry with generated sulfuric acid solution formed in said iron removal and with iron and zinc-containing solution obtained from an activation leach, (d) precipitating any copper present in solution in said second step of said second-stage acid leach, (e) separating essentially copper-free solution from the diluted slurry, (f) precipitating substantially pure zinc sulfide from said copper-free acid solution with $H_2S$ at a partial pressure of $H_2S$ of at least 500 kPa and at a temperature of at least 80° C., (g) separating zinc sulfide from acid solution, and (h) returning said acid solution to the first-stage acid leach.

12. A process as claimed in claim 11, wherein solids contained in the diluted slurry after separation of essentially copper-free solution are subjected to an activation leach with acidic copper sulfate solution containing from 20 to 100 g/l Cu, from 3 to 15 g/l Fe, from 5 to 35 g/l $H_2SO_4$ and from 5 to 20 g/l Zn at a temperature in the range of 140° to 200° C. under autogenous pressure for a period in the range of 1 to 4 hours at a molar ratio between cupric ions in said acidic copper sulfate solution and extractable iron and zinc in said solids in the range of 0.65:1 to 2.1:1, whereby activated simple copper sulfides and an iron and zinc-containing solution are formed.

13. A process as claimed in claim 12, wherein reaction mixture from said activation leach containing activated simple copper sulfides and iron and zinc-containing solution is treated in a two-stage countercurrent separation with generated sulfuric acid solution from said iron removal as jarosite to form a solids fraction with reduced iron content and a liquid fraction consisting of iron and zinc-containing solution, and separated iron and zinc-containing solution is recycled to the second step of the second-stage acid leach.

14. A process as claimed in claim 11, 12 or 13, wherein solids obtained from said first-stage acid leach are repulped with at least a portion of said acid solution separated from said zinc sulfide, repulped solids are separated from acid solution, separated repulped solids are fed to the first step of said second-stage acid leach and separated acid solution is recycled to the first-stage acid leach.

15. A process as claimed in claimed in claim 11, 12 or 13, wherein thermally activated metal sulfides are leached in the first-stage acid leach at a temperature of at least 75° C. and essentially atmospheric pressure with at least a portion of an acid solution essentially free of copper and containing 60 to 130 g/l sulfuric acid, 15 to 40 g/l iron as ferrous sulfate and less than 5 g/l zinc, the leached solids are separated from solution, and the separated solids are subjected to the first step of the second-stage acid leach at a temperature in the range of 60° to 100° C. wherein said solids are mixed with 93% sulfuric acid in an amount sufficient to give an acid concentration in the range of 200 to 250 g/l and a density of said solids in the mixture in the range of 40 to 50%.

16. A process as claimed in claim 11, 12 or 13, wherein essentially copper-free solution containing 5 to 20 g/l Zn, 70 to 120 g/l free acid and 15 to 40 g/l Fe is treated with $H_2S$ at a temperature in the range of 80° to 120° C. and a partial pressure of $H_2S$ in the range of 500 to 700 kPa for the precipitation of zinc sulfide.

* * * * *